United States Patent [19]

Fishel et al.

[11] Patent Number: 5,481,838
[45] Date of Patent: Jan. 9, 1996

[54] ANTI-FRACTURE, WATER-RESISTANT, MASONRY-BONDABLE MEMBRANE

[75] Inventors: David L. Fishel, Caledonia; Terry M. Digiglia, Columbus, both of Miss.

[73] Assignee: GenCorp Inc., Fairlawn, Ohio

[21] Appl. No.: 177,057

[22] Filed: Jan. 4, 1994

Related U.S. Application Data

[62] Division of Ser. No. 969,893, Nov. 2, 1992, Pat. No. 5,318,832.

[51] Int. Cl.$^6$ .................................................. E02D 19/00
[52] U.S. Cl. ........................ 52/169.14; 156/71; 428/284; 428/286; 428/287
[58] Field of Search ..................... 156/71; 428/284, 428/286, 287; 52/222, 169.14

[56] References Cited

U.S. PATENT DOCUMENTS

| | | | |
|---|---|---|---|
| 3,641,216 | 2/1972 | Schnebelen | 260/897 |
| 3,646,180 | 2/1972 | Winnick . | |
| 3,663,350 | 5/1972 | Stokes . | |
| 4,103,061 | 7/1978 | Chomes . | |
| 4,603,074 | 7/1986 | Pate et al. . | |
| 4,935,281 | 6/1990 | Tolbert et al. . | |
| 5,318,832 | 6/1994 | Fishel | 428/287 |

FOREIGN PATENT DOCUMENTS

| | | |
|---|---|---|
| 849775 | 6/1977 | Belgium . |
| 1252380 | 4/1989 | Canada . |
| 0252434 | 1/1988 | European Pat. Off. . |
| 2298432 | 1/1975 | France . |
| 1149002 | 3/1966 | United Kingdom . |
| 2115741 | 9/1983 | United Kingdom . |

*Primary Examiner*—Carl D. Friedman
*Assistant Examiner*—Beth A. Aubrey
*Attorney, Agent, or Firm*—Robert F. Rywalski; Daniel J. Hudak

[57] ABSTRACT

An anti-fracture, water-resistant, masonry-bondable membrane comprises a lamina having a central layer generally containing at least one ply of a flexible material, e.g., an organic polymer such as polyvinyl chloride, generally in the form of a sheet, and a nonwoven fiber layer physically bonded to each side thereof. The formation of the lamina is generally accomplished by laminating a single, nonwoven layer to a layer or sheet of a flexible material in the presence of heat and pressure to produce a construction wherein the nonwoven fibers are partially embedded in the flexible material. Subsequently, two such constructions are bonded together under heat and pressure to produce essentially a four-ply lamina wherein the layers of flexible material such as a polymer are fused to one another. The flexible membrane lamina, when utilized between and bonded to an exterior masonry article such as ceramic tile and to a substrate such as concrete, is very effective in preventing any cracks from propagating from the substrate to the article. The flexible membrane also has very good hydrostatic water resistance.

3 Claims, 1 Drawing Sheet

ANTI-FRACTURE, WATER-RESISTANT, MASONRY-BONDABLE MEMBRANE

CROSS-REFERENCE

This is a division of application Ser. No. 07/969,893, filed Nov. 2, 1992, now U.S. Pat. No. 5,318,832, of David L. Fishel And Terry M. DiGiglia, for "AN ANTI-FRACTURE, WATER-RESISTANT, MASONRY-BONDABLE MEMBRANE".

FIELD OF INVENTION

The present invention relates to an anti-fracture, water-resistant, masonry-bondable membrane having a flexible central layer and a layer of nonwoven fibers physically bonded to each side thereof.

BACKGROUND

Heretofore, various membranes have been utilized between an exterior masonry article such as ceramic tile or marble and a masonry substrate such as concrete or stone to form a water-resistant barrier as well as a flexible layer which prevents cracks in the substrate from propagating into the article. Such a particular membrane contained an exterior, nonwoven, fiber material which was chemically bonded to a polyvinyl chloride intermediate layer on each side thereof by an adhesive. Such a lamina had poor hydrostatic water resistance and generally poor bondability to masonry bonding materials such as mortar or cement. Delamination would thus readily occur between the membrane and the masonry bonding material.

SUMMARY OF THE INVENTION

A flexible, anti-fracture, water-resistant membrane comprises a lamina containing a central layer of a flexible material such as a polymer which is physically bonded on each side to a layer of nonwoven fibers. Although the lamina is relatively thin, it has good hydrostatic water resistance and good bonding to masonry bonding materials. The lamina is readily made by laminating a nonwoven fiber layer to a layer of a flexible material through the application of heat and pressure, and subsequently laminating the aforesaid layers together by heat and pressure, with the resultant lamina containing the two flexible layers fused to one another. When utilized as an intermediate membrane in a thin-set application, e.g., ceramic tile, bonded to a masonry substrate, the membrane is effective in forming a water or moisture barrier as well as preventing the propagation of cracks from the substrate to the tile, and the nonwoven layers which have fibers protruding therefrom result in enhanced adhesion with the substrate and the tile.

DETAILED DESCRIPTION OF THE INVENTION

Figure 1:
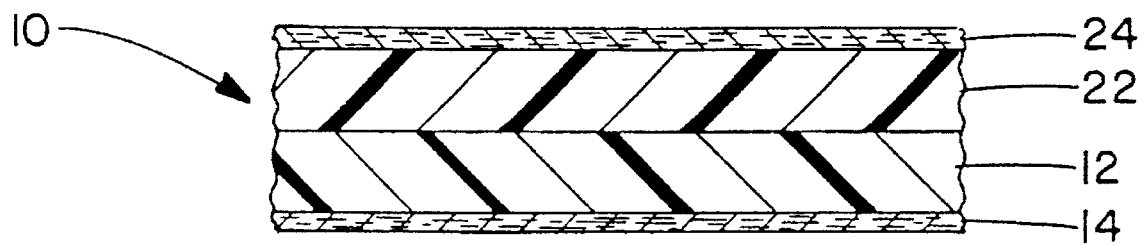
FIG. 1 is a cross-sectional view of a lamina of the present invention wherein a flexible polymer physically bonded to a layer of nonwoven fibers is fuse-bonded to a similar flexible polymer which is also physically bonded to a layer of nonwoven fibers.

The membrane of the present invention is shown in FIG. 1 wherein like reference characters indicate like parts. The membrane, generally indicated by the numeral 10, is a lamina generally containing a flexible layer 12 in the form of a sheet or film. Layer 12 can generally be any flexible material such as an organic polymer, e.g., thermoplastic, amorphous, etc., which acts as a barrier to water and is capable of undergoing heat fusion with a nonwoven fiber layer. Examples of specific flexible polymers include chlorinated polyethylene, polyacrylate, polypropylene, polyurethane, with plasticized polyvinyl chloride being preferred. Optionally, a preferred flexible polymer is a copolymer made from vinyl chloride monomers and small amounts of comonomers such as esters of acrylic acid wherein the ester portion has from 1 to 12 carbon atoms, for example, methyl acrylate, ethyl acrylate, butyl acrylate, octyl acrylate, cyanoethyl acrylate, and the like; vinyl acetate; esters of methacrylic acid wherein the ester portion has from 1 to 12 carbon atoms, such as methyl methacrylate, ethyl methacrylate, butyl methacrylate, and the like; styrene and styrene derivatives having a total of from 8 to 15 carbon atoms such as alpha-methylstyrene, vinyl toluene, or chlorostyrene; vinyl naphthalene; diolefins having a total of from 4 to 8 carbon atoms such as butadiene, isoprene, and including halogenated diolefins such as chloroprene or monoolefins having from 2 to 10 carbon atoms and preferably 2 to 4 carbon atoms; and mixtures of any of the above. The amount of the comonomer is generally up to about 30 percent by weight and desirably up to 20 percent by weight.

Regardless of whether polyvinyl chloride homopolymer or copolymer is used, the inherent viscosity thereof according to ASTM-D-1240-60, Method A, in cyclohexane at 20° C. is generally from about 0.85 to about 1.10, and preferably from about 0.90 to about 0.96.

When the flexible material layer is a polymer, it can contain conventional additives in conventional amounts, such as processing aids, mildew-resistant compounds, light and heat processing stabilizers such as epoxidized soybean oil, lubricants such as stearic acid, flame retardants, pigments, and the like.

When the flexible layer is the preferred homopolymer of vinyl chloride or a copolymer thereof, it is an important aspect of the present invention that less than conventional amounts of plasticizer be utilized in order to obtain desirable physical properties such as those set forth below. Examples of conventional plasticizers include various phthalates, e.g., dioctyl phthalate, diisononyl phthalate, diisodecyl phthalate, as well as various terephthalates. The amount of plasticizer for this invention is generally 65 parts or less, desirably from about 35 to about 55 parts, and preferably from about 40 to about 50 parts by weight per 100 parts by weight of the vinyl chloride homopolymer or copolymer resin.

Regardless of whether a vinyl chloride homopolymer or copolymer is used, the inherent viscosity thereof according to ASTM-D-1240-60, Method A, in cyclohexane at 20° C., is generally from about 0.85 to about 1.10, and preferably from about 0.90 to about 0.96.

The thickness of the flexible layer 12 is generally from about 12.5 mils to about 25 mils (from about 0.318 to about 0.635 millimeters), desirably from about 14 to about 22 mils (from about 0.356 to about 0.559 millimeters), and preferably from about 15 to about 20 mils (from about 0.381 to about 0.508 millimeters).

Nonwoven fiber layer 14, desirable in the form of a mat, is attached to flexible polymer layer 12. More specifically, nonwoven layer 14 is physically bonded to the flexible layer through the application of pressure and heat. The process of physically laminating the two layers together involves pressing the two layers or sheets together as through the use of a calender roll or other appropriate laminating apparatus at a pressure of from about 125 to about 450 (from about 2,232 to about 8,036) desirably from about 135 to about 350 (from about 2,411 to 6,250), and preferably from about 150 to about 200 pounds per linear inch (from about 2,679 to about 3,572 kilograms per linear meter) with the calender rolls being heated to a temperature of from about 280° F. to about 350° F. (from about 138° C. to about 177° C.), desirably from about 300° F. to about 335° F. (from about 149° C. to about 186° C.), and preferably from about 300° F. to about 320° F. (from about 149° C. to about 160° C.). The flexible material such as a polymer and/or the nonwoven layer can optionally be preheated to approximately the same temperatures. Such temperatures are generally above the softening point of the flexible material, e.g., a polymer, but below the melting point thereof. An alternate laminating method is extruding the flexible material and subsequently running it through a nip roll with the nonwoven layer to form the two-ply laminate. Generally, the flexible material fed to the laminating apparatus exists at an elevated temperature as from about 270° F. to about 350° F. (from about 132° C. to about 177° C.) inasmuch as it is usually generally fed directly from a Banbury or an extruder, etc., to the laminating apparatus and is soft. Regardless of the particular type of laminating apparatus utilized, the nonwoven layer is partially pressed into the soft, flexible material and is physically bonded thereto; that is, no chemical bond, as generated by a chemical reaction, exists. Neither is a separate adhesive used. It is important that the nonwoven layer be only partially embedded in the flexible polymer layer so that the remaining portion thereof still possesses outward protruding fibers or a rough surface, and can form an effective bond, i.e., be adhered, to a masonry bonding material. The amount of fibers embedded is generally from about 20 percent to about 80 percent, desirably from about 30 percent to about 70 percent, and preferably from about 40 to about 60 percent by volume.

Nonwoven fiber layer 14 can be generally any type of synthetic nonwoven material with specific examples including polypropylene, polyester, and nylon, and the like, with polyester such as polyethylene phthalate being preferred. The thickness of the nonwoven layer is generally from about 2 to about 6 mils (from about 0.051 to about 0.152 millimeters), desirably from about 3 to about 5 mils (from 0.076 to about 0.127 millimeters), with from about 4 to about 5 mils (from about 0.102 to about 0.127 millimeters) being preferred.

Optionally, a second nonwoven fiber layer as described above can be laminated and physically bonded to the remaining side of the flexible layer, not shown, such that the resulting lamina contains only one central flexible layer. The process and apparatus for forming such a lamina as well as the various layers thereof can be the same as set forth above, except that desirably the single-ply flexible layer is generally about twice as thick so that the formed membrane has suitable physical properties such as hydrostatic or water burst resistance, modulus, and tensile strength, with regard to its intended end use.

A preferred lamina membrane of the present invention is shown in FIG. 1 wherein another or second nonwoven fiber layer 24 is physically bonded to another or second flexible layer 22. Nonwoven fiber layer 24 can be the same or different than nonwoven layer 14 and flexible polymer layer 22 can be the same material or a different material than flexible layer 12 and each layer can be made of any of the types of materials described hereinabove. Once a second flexible layer 22 having a physically bonded nonwoven layer 24 has been made under heat and pressure in a manner as set forth above, the two articles can be dual-laminated to form the preferred four-ply, anti-fracture, water-resistant membrane of the present invention. The dual laminating process is conducted utilizing conventional laminating equipment such as a calender roll with the flexible materials of each article being heated and subsequently fused together under pressure and heat. Suitable pre-heat temperatures of each layer 12 and 22, independently, are from about 250° F. to about 350° F. (from about 121° C. to about 177° C.) and desirably from about 280° F. to about 300° F. (from about 138° C. to about 149° C.). The temperature of the laminating calender roll is generally from about 260° to about 320° F. (from about 127° C. to about 160° C.), desirably from about 275° to about 310° F. (from about 135° C. to about 154° C.), and preferably from about 290° F. to about 300° F. (from about 143° C. to about 149° C.), with the pressure exerted on each dual-ply component or article being from about 180 to about 450 (from about 3,214 to about 8,036), desirably from about 200 to about 400 (from about 3,572 to about 7,143) and preferably from about 225 to about 350 pounds per linear inch (from about 4,018 to about 6,250 kilograms per linear meter).

An advantage of the dual lamination step is that when flexible layers 12 and 22 are polyvinyl chloride, they often inherently contain pinholes therein and the heat-fusing of one layer to the other eliminates such pinholes and thus significantly decreases, if not eliminates, the penetration of water or vapor therethrough. The peel strength of the one polymer layer to the second polymer layer is generally from about 2 to about 6.5 pounds per linear inch (from about 35.7 to about 116.1) and preferably from about 4 to about 6 pounds per linear inch (from about 71.4 to about 107.1 kilograms per linear meter). The physical bond between the nonwoven fiber layer and its associated flexible polymer layer is stronger than the fused polymer bond layers 12 and 22.

Due to its good physical properties, the four-ply lamina of the present invention containing two central layers of a flexible material is suitable for use as a flexible membrane located between an article which is to be bonded to a masonry substrate. For example, the above-described lamina of FIG. 1 desirably has a hydrostatic or water burst resistance of at least 100 pounds per square inch ($6.894 \times 10^5$ newtons/square meter) a 150 percent modulus of from about 1,200 to about 1,800 or 2,000 pounds per square inch (from about $82.728 \times 10^5$ to about $137.88 \times 10^5$ newtons/square meter) and desirably from about 1,400 to about 1,600 psi (from about $96.516 \times 10^5$ to about $110.304 \times 10^5$ newtons/square meter).

Figure 2:
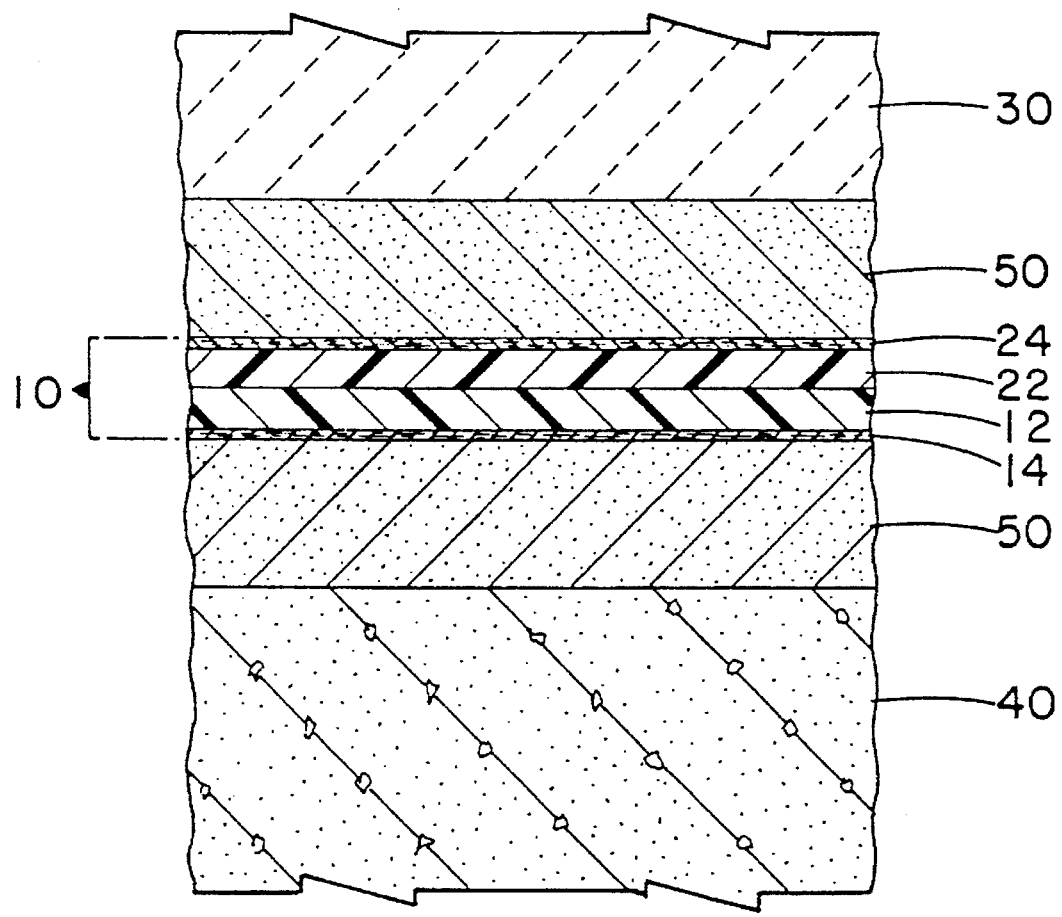
FIG. 2 is a cross-sectional view showing a ceramic tile indirectly bonded by mortar through the flexible membrane lamina of-the present invention to a concrete substrate.

FIG. 2 shows lamina 10 of the present invention used as an anti-fracture, water-resistant membrane in a masonry environment or construction. Specifically, exterior article 30 is indirectly bonded via the lamina 10 of the present invention to a masonry substrate 40. The exterior article 30 is generally a thin-set article of masonry construction, that is, brick, ceramic tile, marble, stone, or the like. The exterior article 30 is typically bonded to the membrane lamina through the use of a masonry bonding material 50 such as mortar, cement, or the like. Due to the fact that nonwoven fiber layer 24 is physically bonded and thus partially embedded in flexible bonding layer 22, but still has a substantial portion thereof residing upon the surface of the polymer layer so as to present outwardly protruding fibers or a rough surface, a strong bond is formed between the lamina and the masonry bonding material. Such a bond generally has the advantage of the absence of (i.e., is free from) any delamination of the nonwoven layer 24. Similarly, the remaining nonwoven layer 14 is bonded through the use of a masonry bonding material 50 to masonry substrate 40 which can be concrete, stone, or the like. The net result is a flexible membrane inner liner which provides good water resistance or impermeability to the exterior article of the masonry construction, as well as water burst resistance and, more importantly, effective crack propagation resistance. That is, should substrate 40 crack due to settling etc., the existence of the flexible membrane inner liner 10 will absorb the stress and/or strain created by the height and/or width created by the crack and significantly retard, if not eliminate, the same from extending to the exterior masonry article such as a ceramic tile.

While the above invention has been described with regard to a specific lamina and utilization thereof, it is to be understood that more than a four-ply lamina or a lamina containing a different arrangement of layers from that set forth in FIG. 1 can be utilized in a masonry construction, as shown in FIG. 2, or in a different construction.

The lamina of the present invention, whether containing a single or dual center layer, has been found to be very effective for the applications set forth immediately below, and generally has a break strength in the machine direction (i.e., calender) of at least 50 pounds and up to about 75 pounds, preferably from about 55 to about 65 pounds (from 23 to 34 kilograms and preferably from 25 to 29 kilograms), and in the cross-direction from at least about 40 to about 60 pounds and preferably from about 45 to about 55 pounds (from about 18 to about 27 kilograms and preferably from about 20 to about 25 kilograms). The tensile strength in the machine direction is generally at least 1,100 psi to about 1,800 psi (at least $76 \times 10^5$ to about $124 \times 10^5$ newtons per square meter), and preferably at least 1,400 to about 1,600 (at least about $96 \times 10^5$ to about $110 \times 10^5$ newtons per square meter. The crack resistance is generally 25° F. or lower (minus 4° C. or lower) and preferably 10° F. or lower (minus 12° C. or lower). The maximum shrinkage of the lamina is desirably 5 percent with 3 percent or less being preferred.

The present invention is suitable for use in shopping centers and malls, patios, basement floors, cementitious backer boards, and the like wherever thin-set exterior masonry articles such as ceramic tiles, marble, and the like are to be applied via an anti-fracture, water-resistant membrane to a masonry substrate.

The invention can be more fully understood and appreciated by reference to the following example which serves to illustrate, but is not intended to limit, the invention.

EXAMPLE

A pair of identical two-ply lamina were formed by physically bonding a nonwoven fiber layer to a plasticized polyvinyl chloride layer by calendering the two layers at a temperature of about 300° F. (149° C.) and at a pressure of about 180 pounds per linear inch (3,214 kilograms per linear meter). A four-ply membrane having a pair of polyvinyl chloride layers which are fused together to form the inner layers and a pair of nonwoven fiber outer layers physically bonded to each of the polyvinyl chloride layers was formed by dual laminating the pair of identical two-ply lamina. The four-ply membrane was formed by placing the pair of identical two-ply lamina in overlaying relationship with the polyvinyl chloride layers of each two-ply lamina facing and abutting one another and passing the overlaying pair of two-ply lamina through a pair of calendering rollers at a temperature of about 300° F. (149° C. ) and at a pressure of about 275 pounds per linear inch (4,911 kilograms per linear meter). The polyvinyl chloride layers were The BFGoodrich Company Geon® vinyl homopolymer having an intrinsic viscosity of approximately 0.93. Each of the two polyvinyl chloride layers had an average thickness of about 17 mils (0.43 millimeters) so that the total thickness of the polyvinyl chloride layers of the four-ply membrane was about 34 mils (0.86 millimeters). The nonwoven fiber layer was made of polyester (polyethylene terephthalate) fibers and had a thickness of about 4 mils (0.102 millimeters). The polyester was manufactured by Reemay Company with 4-denier fibers and weighed 1.25 ounces per square yard.

Various properties of the resulting four-ply membrane of the invention were measured. The results and the methods used are listed in Table I.

The results show that a strong, relatively thin, lightweight, water-resistant membrane having good tear resistance, dimensional stability, cold crack resistance, burst resistance and mildew resistance properties has been provided by the invention disclosed herein.

TABLE I

| | FINISHED PRODUCT TEST RESULTS | |
|---|---|---|
| TEST NAME | TEST METHOD | RESULTS |
| Total Weight | ASTM D-751 | 31.3 Oz. per Sq. Yd. ± 3 oz. |
| Thickness | ASTM D-751 | 0.042 In. Avg. Std. Dev. = 0.0009 in. |
| Peel Strength (Adhesion) Vinyl (Layer 12) to Vinyl (Layer 22) | ASTM D-751 | 5.0 lb./in. avg. 3.5–6.5 lb./in. range |
| Peel strength (Adhesion) Fabric (Layer 14) to Vinyl (Layer 12) | ASTM D-751 | Internal bonding of vinyl layer 12 to vinyl layer 22 is less than the bonding strength between fabric 14 and vinyl 12 or fabric 24 and vinyl 22. |
| Breaking Strength = (1" strip tensile) | ASTM D-751 | Machine Direction = 62 avg. lb. force std. dev. 3.1 lb. Cross machine = 50 avg. lb. force std. dev. = 3.76 lb. |
| Tensile Strength | ASTM D-882 | Machine direction = 1502 avg. psi std. dev. = 81.1 lb. Cross machine = 1135 Avg. psi std. dev. = 91 lb. |
| Trapezoid Tear lb. | ASTM D-751 | Machine direction = 63 lb. avg. std. dev. = 5.0 Cross machine = 62 lb. avg. std. dev. = 7.2 lb. |
| Dimensional Stability | 1½ minutes in Boiling Water | Machine direction = 3% shrinkage avg. Cross machine = 1.3% growth avg. |
| Cold Crack Resistance Masland Impact | ASTM D-1790 | No cracks at +10° F. |
| Burst Resistance | FTMS-191 A Method 5512 | 121 psi avg. std. dev. = 4.9 psi |

TABLE I-continued

| | FINISHED PRODUCT TEST RESULTS | |
| --- | --- | --- |
| TEST NAME | TEST METHOD | RESULTS |
| Mildew Resistance | (Hydrostatic Pressure) Pink Stain Test | Clear zone of inhibition |

While in accordance with the Patent Statutes, the best mode and preferred embodiment has been set forth, the scope of the invention is not limited thereto, but rather by the scope of the attached claims.

What is claimed is:

1. A masonry, anti-fracture, water-resistant construction, comprising; a lamina having a central layer comprising at least one ply of a flexible layer which is a vinyl chloride homopolymer or copolymer containing from about 35 to about 55 parts by weight of a plasticizer per 100 parts by weight of said vinyl chloride homopolymer or copolymer, and a nonwoven fiber layer physically bonded to each side of said central layer, said central layer having a total thickness of from about 0.63 to about 1.27 millimeters, said lamina bonded with a bonding material on one side to a masonry exterior article and bonded with a bonding material on the remaining side to a masonry substrate.

2. A masonry, anti-fracture, water-resistant construction according to claim 1, wherein said central layer is two plies of heat-fused vinyl chloride homopolymer or copolymer, and wherein said nonwoven fiber is polyester.

3. A masonry, anti-fracture, water-resistant construction according to claim 2, wherein said bonding material is mortar or cement, wherein the vinyl to vinyl peel strength is at least 36 kilograms/linear meter, and wherein said membrane is crack free when said membrane is subjected to a Masland impact test at −12° C.

* * * * *